(12) United States Patent
Sommer et al.

(10) Patent No.: US 6,356,813 B1
(45) Date of Patent: Mar. 12, 2002

(54) METHOD AND APPARATUS FOR CONTROLLING OPERATIONS IN A VEHICLE

(75) Inventors: Rainer Sommer, Stuttgart; Steffen Gieseler, Oberriexingen; Taskin Ege, Tamm, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/686,674

(22) Filed: Oct. 11, 2000

(30) Foreign Application Priority Data

Oct. 11, 1999 (DE) .......................... 199 49 051

(51) Int. Cl.$^7$ ............................. G05B 15/00; H04N 7/14

(52) U.S. Cl. ................................ 701/1; 701/22; 701/33; 701/36; 711/154; 714/18; 714/49; 340/172.5; 371/9

(58) Field of Search ........................... 701/1, 101, 36, 701/24, 29, 33; 714/4, 49; 711/154; 395/728

(56) References Cited

U.S. PATENT DOCUMENTS

| 4,884,204 A | * | 11/1989 | Seibt et al. ................. 701/101 |
| 5,848,367 A | * | 12/1998 | Lotocky et al. ............... 701/36 |
| 6,049,889 A | * | 4/2000 | Steely, Jr. et al. .............. 714/4 |
| 6,052,632 A | * | 4/2000 | Iihoshi et al. ................. 701/36 |

* cited by examiner

Primary Examiner—William A. Cuchlinski, Jr.
Assistant Examiner—Than C To
(74) Attorney, Agent, or Firm—Kenyon & Kenyon

(57) ABSTRACT

A method and an apparatus for controlling operations in a vehicle, at least two processors accessing at least one memory device and a simultaneous read and/or write access of the at least two processors to the identical address of the memory device during program execution being prevented. The identical address is detected by way of an address comparison, and as a function of this address comparison a signal is transmitted to at least one processor. In particular, a first signal is transmitted to a first processor and a second signal to a second processor. Program execution by at least one of the at least two processors is thereby brought to a halt by the signal, or the respective processor is halted.

7 Claims, 2 Drawing Sheets

METHOD AND APPARATUS FOR CONTROLLING OPERATIONS IN A VEHICLE

FIELD OF THE INVENTION

The present invention relates to a method and apparatus for controlling operations in a vehicle, at least two processors accessing at least one memory means.

BACKGROUND INFORMATION

German Patent No. 41 29 809 describes a multi-computer system, in particular for controlling operations in motor vehicles, in which at least two computers jointly access one memory means. In order, in the case of multiple computers, to guarantee data transfer security when accessing the same memory, and to minimize delays due to data interchange between the computers, the memory means is divided into at least two regions. The first memory region is accessed by a first computer only in reading fashion and by a second computer only in writing fashion. The second memory region is accessed by the second computer only in reading fashion and by the first computer only in writing fashion. The computers are synchronized in such a way that they access the memory means at the same point in time in the same fashion. Since the two computers are now accessing decoupled memory regions in either reading or writing fashion, a collision—i.e. a read or write access to the identical address in the memory means—is prevented. This synchronization can, however, result in undesirable waiting times during program execution.

It is thus evident that the existing art is not capable of providing optimum results in every respect.

The object thus arises, in the context of at least two processors which, in particular, operate independently of one another and which access one memory means, of achieving asynchronous data transfer and the highest possible data throughput, and of optimizing the detection and avoidance of collisions in the event of a simultaneous read and/or write access.

SUMMARY OF THE INVENTION

The present invention is based on a method and an apparatus for controlling operations in a vehicle, at least two processors accessing at least one memory means and a simultaneous read and/or write access, in the case of at least two processors, to the identical address of the memory means during program execution being prevented. Advantageously, an address comparison is used, before the actual read and/or write access, to detect the fact that at least two processors are accessing the identical address.

As a function of the address comparison, preferably a first signal is transmitted to the first processor and a second signal to a second processor, and program execution by at least one of the at least two processors is brought to a halt by the respective signal.

Advantageously, because program execution by the at least first of the at least two computers is brought to a halt by the respective signal until different addresses are once again detected in the address comparison and/or until the read and/or write access of the at least second processor is complete, access by the at least two processors to the at least one memory means is decoupled in time.

In an advantageous embodiment, program execution by at least one of the at least two processors is brought to a halt by the respective signal for a time that is definable and/or can be ascertained from the address comparison.

It is furthermore advantageous that the read and/or write accesses of the at least two processors to addresses of the at least one memory means can occur asynchronously, i.e. at any desired points in time.

Advantageously, what serves as the criterion for simultaneous or almost simultaneous access to the identical address in order to determine which processor's program execution is to be brought to a halt is the identity of the processor which first started the access or the processor by which the address was first transmitted.

The advantageous result of this is to prevent the content read at an address from being invalid.

A cost advantage is thereby obtained on the one hand as compared to the use of synchronous memory means and a device that synchronizes access, and on the other hand as compared to the use of complex hardware circuits, for example additional registers (hardware semaphores) for collision avoidance.

Because both subsystems, in particular both processors, thus asynchronously operate at full performance and exchange data, higher data throughputs can be obtained. The processors operate independently, and access the shared memory means at any desired points in time. The present invention can, of course, also be utilized for synchronized operation of the at least two processors.

An additional interrupt workload or interrupt processing workload as a consequence of computer coupling, i.e. coupling of the two processors, is also advantageously avoided.

Advantageously, the additional run time workload is very small, since a temporal access decoupling occurs only if a conflict is imminent, which occurs very seldom. This guarantees that the data in the memory are as up-to-date as possible.

DETAILED DESCRIPTION

Figure 1:
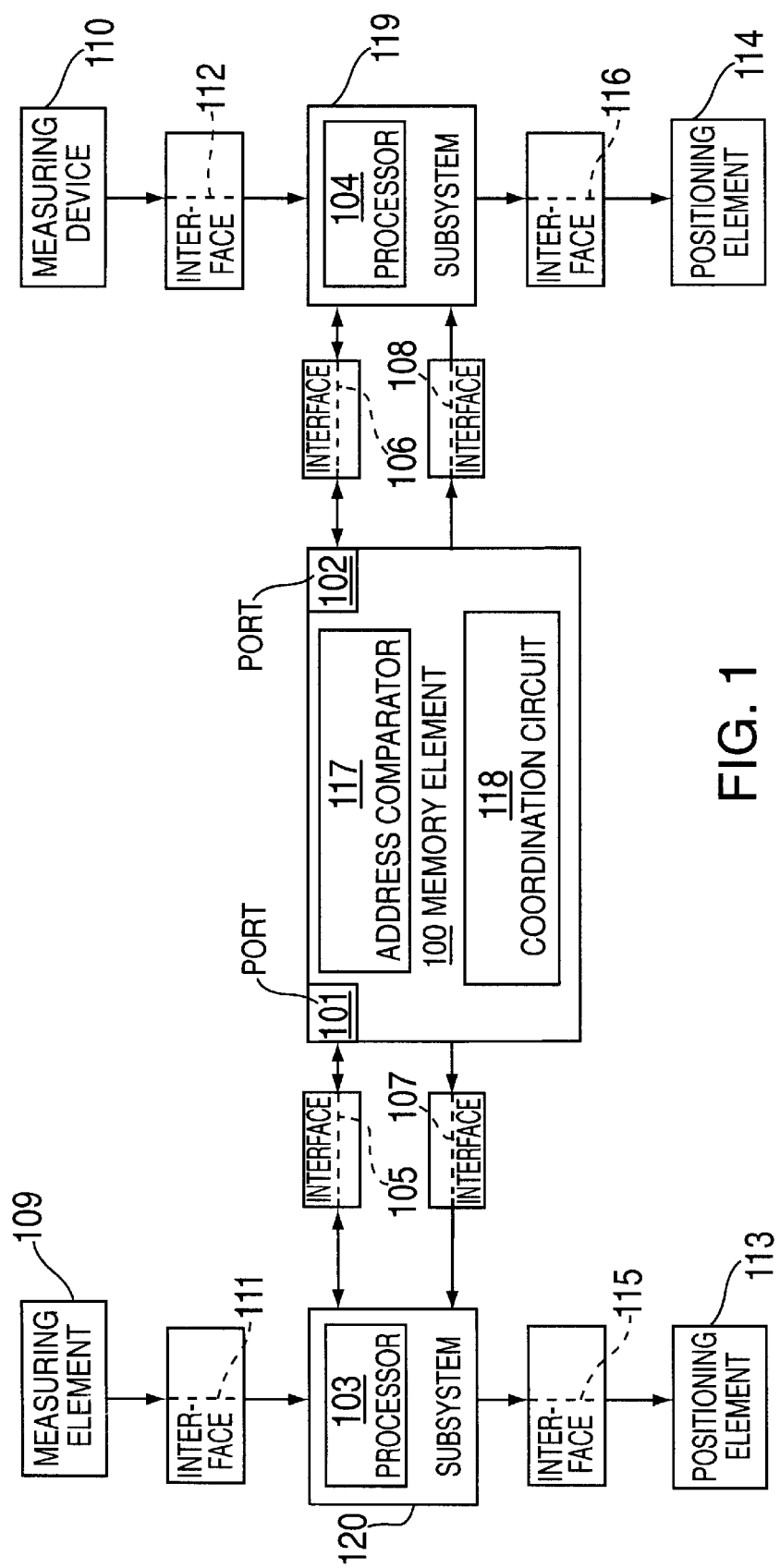
FIG. 1 schematically shows a system having at least two processors that access one memory means.

FIG. 1 shows a system for controlling operations or processes in a vehicle. In this context, 119 depicts a first subsystem, in particular a control unit 119 having a processor 104, in particular a CPU. Operating variables that are measured or otherwise ascertained are delivered from an element 110, which corresponds to a measurement device, a further control unit, etc., via interface 112 to subsystem 119. These signals that are transmitted via interface 112 thus correspond to measured operating variables, or such operating variables can be derived from these signals. As a function of the input signals, operating variables derived therefrom, and/or internal variables, processor 104 calculates, in the context of the programs or control functions implemented in at least one memory in the form of program code, values for the control variables that are to be output, which adjust positioning elements, depicted in particular by element 114, in the context of a predefined control or regulation strategy. The operations to be controlled in this context are, for example, part of a transmission control system; a control system for the chassis (ABS, ASR, ESP, etc.), in particular for the brakes; a control system for electronic convenience and safety systems; a control system for a drive unit, in particular an internal combustion engine; a control system for the drivetrain; or other control operations contained in the vehicle.

Subsystem 119 and subsystem 120 are preferably control units for controlling a drive unit, in particular an internal combustion engine of a motor vehicle. In this context, signals which correspond to measured operating variables of the drive unit, the drivetrain, and/or the vehicle, or from which such operating variables can be derived, are delivered from elements 109 and 110, in particular measurement elements or further control units, via interfaces 111 and 112 to subsystems 119 and 120.

These subsystems can on the one hand correspond only to processor units or processors 103 and 104, or can contain further elements such as memory elements (in particular a program memory), further interfaces, or the like. Processors 103 and 104 and subsystems 119 and 120 can be either housed in one control device or distributed over various control devices.

The signal or operating variables delivered by elements 109 and 110 are, in particular, operating variables of a kind that can be analyzed in order to control a drive unit, in particular an internal combustion engine. Also output via interfaces 115 and 116 are signals which actuate positioning elements or actuators in order to adjust at least one operating variable of the vehicle, in particular of a drive unit. As a function of the input signals, operating variables derived therefrom, and/or internal variables, the respective processor unit 104 or 103 thus calculates, in accordance with a control or regulation strategy, the control variables for positioning elements 113 and 114. In known fashion, for example, the position of a control element that is actuable by the driver is sensed and analyzed, and a setpoint for a torque value of the drive unit is ascertained. This then results, in consideration of the setpoints received via interfaces 111 and 112 of, for example, other control systems such as an automatic slip control system, a transmission control system, etc., and of internally calculated setpoints (limits, etc.), in the determination of a setpoint for, e.g., the torque. In the preferred exemplary embodiment of an internal combustion engine control system, this is then converted into a setpoint for the position of the throttle valve, which is adjusted in the context of a position control loop. Further performance-determining functions are additionally provided depending on how the internal combustion engine is equipped, for example control systems for a turbocharger, an exhaust gas recirculation system, an idle speed controller, etc.

In addition, in the case of an internal combustion engine with direct fuel injection, performance is determined not only by the air setting but also by the determination of the fuel mass to be injected, the determination of an air/fuel ratio that is to be set, the definition of the injection profile (pre-injection, post-injection), the control of a charge movement valve, etc. so that in such a case, in addition to the ones mentioned, a plurality of further programs or control functions must be provided that have an influence on the performance of the internal combustion engine and thus on the safety of the vehicle.

The programs required for this purpose can be accommodated in program memories contained in subsystems 119 and 120, or in a central memory 100. Similarly, data can be stored either in the subsystems themselves (i.e. in 119 and 120) in memory elements, or in a shared memory element 100. If programs and/or data are stored in a central memory element 100, then both subsystems (or, in particular, processors 103 and 104) access this central memory element 100. This occurs via ports 101 and 102 by way of interfaces 105 and 106. By way of interfaces 105 and 106, processors 103 and 104 thus write into memory element 100 and read out from it. This bi-directional transfer of information can occur in either serial or parallel fashion. Parallel transfer of information has the advantage that for an address comparison, the address in question is available very quickly.

Memory element 100 can be a dual-port RAM for coupling between the processors or can also, for example, be configured as an ordinary (i.e. single-port) RAM having an upstream multiplexer. In principle, however, any desired volatile or nonvolatile memory can be used in this context.

In the case of a normal volatile memory, i.e. when each processor has access, for example, for half the time, the two share the memory without access problems. This nevertheless means limitations on performance.

Memory element 100 contains an address comparator 117. Address comparator circuit 117 serves to recognize the situation in which both processors 103 and 104 are accessing the identical address. In this context, the two addresses are compared via ports 101 and 102, for example by way of a comparator arrangement, and as a function of the result of the comparison, signals are transferred to processors 103 and 104. These signals are transmitted via interfaces 107 and 108. In the simplest case, a stop signal is transmitted via interfaces 107 and 108 to the processor that is to be halted.

Element 118 serves to perform coordination as to which processor is to be halted, i.e. which signal is to be transferred to which processor. This coordination circuit 118 is advantageously also housed in memory element 100 or together with the latter in one component. Thus in the simplest case a determination is made, by way of the address comparison in address comparator 117, that the two processors 103 and 104 want to access an identical address. The access need not occur absolutely simultaneously: simultaneity in this context also means occurrence within a specific definable time window. Several variants are possible: on the one hand, transmission of the data following the address transfer can be delayed until the address of the second processor has been completely compared to the first. This has the disadvantage, however, of creating waiting times. A further possibility is simply to determine, when an address is pending, whether the respective other processor is also planning an access. If an address is already pending from the respective other processor, the address is then first compared before the second one can begin its access. If no further address of the respective other processor is present when the address is sent, then after transfer of the complete address, the write/read access of the processor that accessed first is begun automatically. These checks are performed in comparator circuit 117.

In one example, therefore, a DPRAM can be used with memory element 100 for coupling between the microprocessors, the signals of the DPRAM then being sent without additional hardware to the processors and used to automatically decouple in time the imminent conflict situation of quasi-simultaneous access to the identical DPRAM memory cell. In this context, at least one processor is temporarily halted or program execution by that processor is brought to a halt.

Thus in principle, write-type and read-type access to data in the DPRAM in the microprocessor occurs at any desired point in the program execution, with no limitation or additional software features.

In the simplest case, coordination circuit 118 outputs a single signal. For creation of the signals, in particular in the form of flags or longer messages, the addresses, chip enable signals, output enable signals, and read and write signals of the two ports 101 and 102 can, depending on the embodiment, be utilized individually or in combination in coordination logic 118 to create the signals via interfaces 107 and 108.

Figure 2:
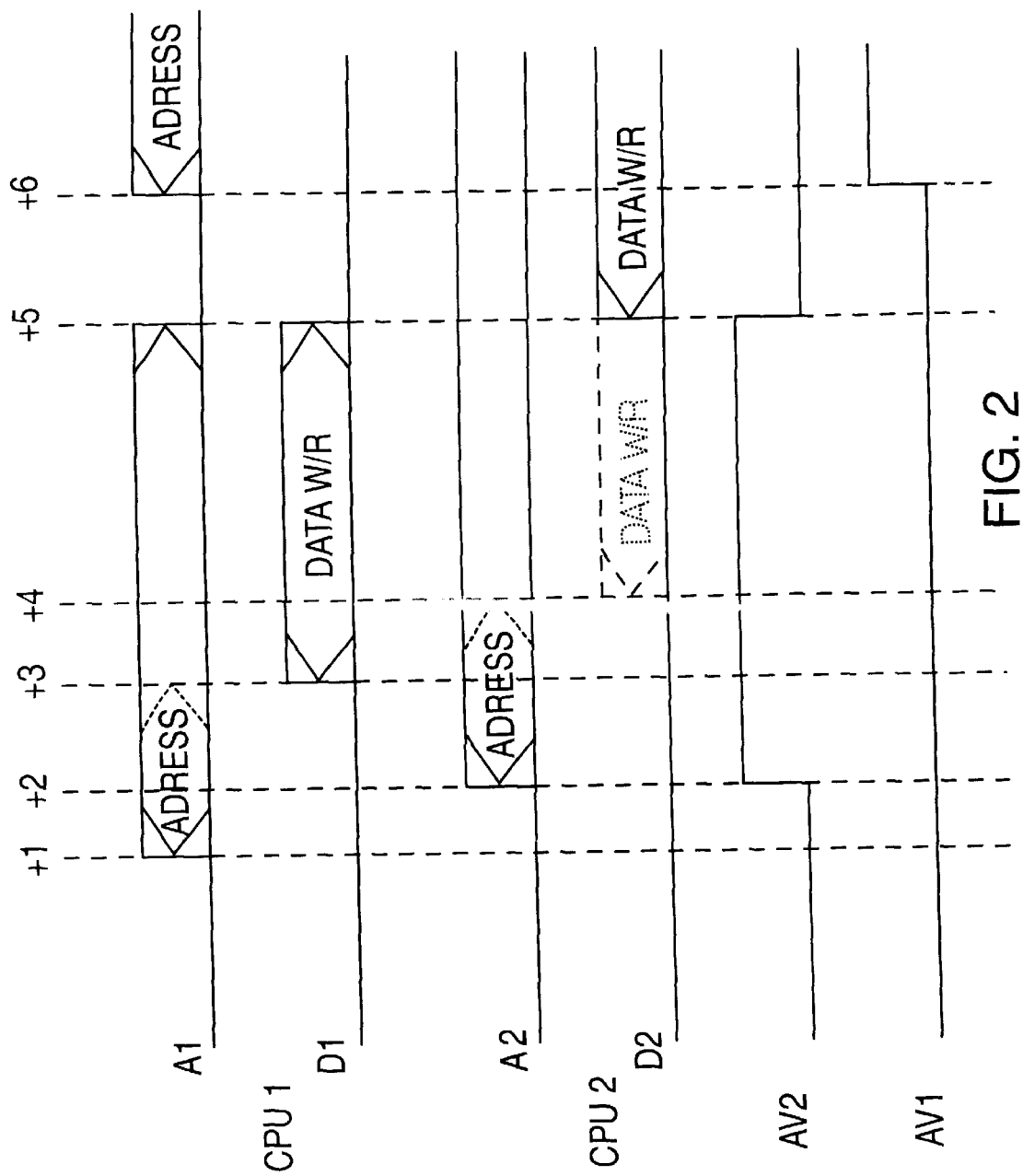
FIG. 2 explains the idea of the present invention with reference to the signal profile of the processors and a comparison means for bringing program execution to a halt in at least one processor.

The idea of the present invention is illustrated once again by way of an example in FIG. 2, in the form of a signal flow diagram. At time t1, processor 103 (i.e. in this case CPU1) begins transmitting the access address. A signal A1 is thus transmitted via interface 105 and port 101 to memory element 100. At time t2, processor 104 (here labeled CPU2) begins transmitting an address for a write/read access. The relevant signal is here labeled A2. A determination is thus made in comparison circuit 117 at time t2 that two addresses (possibly identical addresses) are being accessed simultaneously. A signal AV2 is thus initiated in the address comparator at time t2.

Since no further address was pending at time t1, at time t3 processor 103 (i.e. CPU1), following complete transmission of the address (i.e. signal A1), begins the write/read access (W/R) to the above address. At the same time, a second signal AV1 is created which is intended for the respective other processor. At time t4, processor 104 (i.e. CPU2) has therefore completely transmitted the address (i.e. signal A2) and would begin its write/read access (i.e. signal D2) to memory element 100. If it is determined in address comparator 117 that the two addresses (i.e. signals A1 and A2) are identical, signal AV2 is output by coordination circuit 118 to CPU2 (i.e. processor 104). Access to the memory location is thereby brought to a halt. At the same time, AV1 is output via interface 108 to processor 103 (i.e. CPU1), allowing continued access. At time t5, the access by CPU1 (i.e. processor 103) is complete. The desired address (i.e. signal A1) is present up to this time t5. The address of CPU2 (i.e. processor 104) also continues to be maintained. At time t5, the address comparison thus indicates that identical addresses are no longer pending in terms of access, or that access by CPU1 (i.e. processor 103) is complete. Signal AV2 for CPU2 thus ends. The write/read access (i.e. signal D2) to the desired address thus begins at time t5.

At time t6 CPU1 wishes, for example, to access the identical address again. But since CPU2 is now currently in a write/read access to that address, signal AV1 is set, and is output to CPU1 (i.e. processor 103) via line 107 by coordination circuit 118. As a result, access by processor 103 (i.e. CPU1) is in turn brought to a halt.

Instead of transmitting two signals AV2 and AV1 (or the data derived therefrom) to the two processors, it would also be possible to create only one signal AV which could be interpreted as a stop signal, and which is conveyed to one or the other processor by coordination circuit 118 as appropriate. As a result of this signal, the respective processor, in particular the one (i.e., in the context of two processors, the second one) that is accessing the identical address too late, is stopped or program execution is brought to a halt until the access collision is no longer occurring.

An advantage of the present invention is thus in particular the fact that the two subsystems 119 and 120 or processors 104 and 103 can operate and exchange information asynchronously and thus essentially at full performance. Feedback from one subsystem to the other thus exists only if the two simultaneously wish to address the identical cell in the memory element, in particular in a dual-port RAM, and thus one processor is halted briefly in order to prevent the collision. Since this occurs only rarely, the performance limitation resulting from the method and the apparatus is negligible.

Instead of a DPRAM, a memory means having more than two simultaneous access capabilities can also be used according to the present invention, in particular a quadrupole RAM, i.e. a volatile memory having in this case specifically the capability for four simultaneous accesses by, for example, two or four processors.

What is claimed is:

1. A method for controlling operations in a vehicle, comprising the steps of:
    performing an address comparison to detect an identical address of a first operation by a first of at least two processors accessing at least one memory device and of a second, simultaneous operation by a second of the at least two processors accessing the at least one memory device, each of the first and second operations being one of a read operation and a write operation;
    transmitting at least one signal to at least one of the first and second processors as a function of the address comparison; and
    halting a program execution by the at least one of the first and second processors in response to the at least one signal, in order to prevent a simultaneous access of the first and second processors to the identical address of the at least one memory device during program execution.

2. The method according to claim 1, wherein the at least one signal includes a first signal transmitted to the first processor and a second signal transmitted to the second processor, the program execution of at least one of the first and second processors being halted by at least one of the first and second signals.

3. The method according to claim 1, wherein the program execution by the at least one of the first and second processors is halted by the at least one signal until at least one of (a) different addresses are detected in the address comparison and (b) the access of the other of the first and second processors is complete.

4. The method according to claim 1, wherein the program execution is halted by the at least one signal for a time that is based on the address comparison.

5. The method according to claim 1, wherein accesses to addresses of the at least one memory device during program execution by the first and second processors occur asynchronously, at any desired points in time.

6. The method according to claim 1, wherein the program execution by the second processor is halted if access of the first processor to the identical address simultaneously is detected before access of the second processor on the basis of the address comparison.

7. An apparatus for controlling operations in a vehicle, comprising:
    at least two processors including a first processor and a second processor;
    at least one memory device;
    means for performing an address comparison to detect an identical address of a first operation by the first processor accessing the at least one memory device and of a second, simultaneous operation by the second processor accessing the at least one memory device, each of the first and second operations being one of a read operation and a write operation;
    means for transmitting a first signal to the first processor and a second signal to the second processor as a function of the address comparison; and
    means for halting a program execution by at least one of the first and second processors in response to at least one of the first and second signals, in order to prevent a simultaneous access of the first and second processors to the identical address of the at least one memory device during program execution.

* * * * *